United States Patent
Reifenberger et al.

(10) Patent No.: US 6,433,315 B2
(45) Date of Patent: *Aug. 13, 2002

(54) MELTER TANK FOR THERMOPLASTIC MATERIAL AND CHASSIS FOR SAID TANK

(75) Inventors: Mark G. Reifenberger, Norcross; David R. Jeter, Woodstock; William A. Harben, Dacula; David F. Andel, Lawrenceville, all of GA (US)

(73) Assignee: Nordson Corporation, Westlake, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/800,029

(22) Filed: Mar. 6, 2001

Related U.S. Application Data

(63) Continuation of application No. 09/334,318, filed on Jun. 16, 1999, now abandoned, which is a continuation of application No. 08/833,943, filed on Apr. 14, 1997, now Pat. No. 5,919,384.

(51) Int. Cl.[7] .................................................. F27B 14/00
(52) U.S. Cl. ..................... 219/421; 219/424; 222/146.5
(58) Field of Search ................................ 392/441, 444, 392/445, 446, 458; 219/424, 421, 429, 433; 222/146.5, 146.1, 146.2; 432/161

(56) References Cited

U.S. PATENT DOCUMENTS

| | | | |
|---|---|---|---|
| 3,585,361 A | 6/1971 | Rosen et al. |
| 3,964,645 A | 6/1976 | Scholl |
| 3,981,416 A | 9/1976 | Scholl |
| 4,208,043 A | 6/1980 | Sieurin |
| 4,303,108 A | 12/1981 | Akers et al. |
| 4,456,151 A | 6/1984 | Lewellen |
| 4,474,311 A | 10/1984 | Petrecca |
| 4,485,942 A | 12/1984 | Petrecca |
| 4,667,850 A | 5/1987 | Scholl et al. |
| 4,821,922 A | 4/1989 | Miller et al. |
| 4,848,420 A | 7/1989 | Claassen |
| 5,645,743 A | 7/1997 | Zook |
| 5,919,384 A | 7/1999 | Reifenberger et al. |

FOREIGN PATENT DOCUMENTS

| | | |
|---|---|---|
| DE | 1577630 | 3/1970 |
| DE | 3522671 A1 | 1/1987 |
| EP | 0107077 A | 5/1984 |

*Primary Examiner*—Jiping Lu
(74) *Attorney, Agent, or Firm*—Wood, Herron & Evans, L.L.P.

(57) ABSTRACT

An apparatus for melting and dispensing thermoplastic materials such as thermoplastic adhesives referred to as "hot melt" adhesives. More specifically, a one-piece melter tank is suspended from the top of a chassis which also serves as the housing for the entire assembly of the melting and dispensing apparatus.

8 Claims, 7 Drawing Sheets

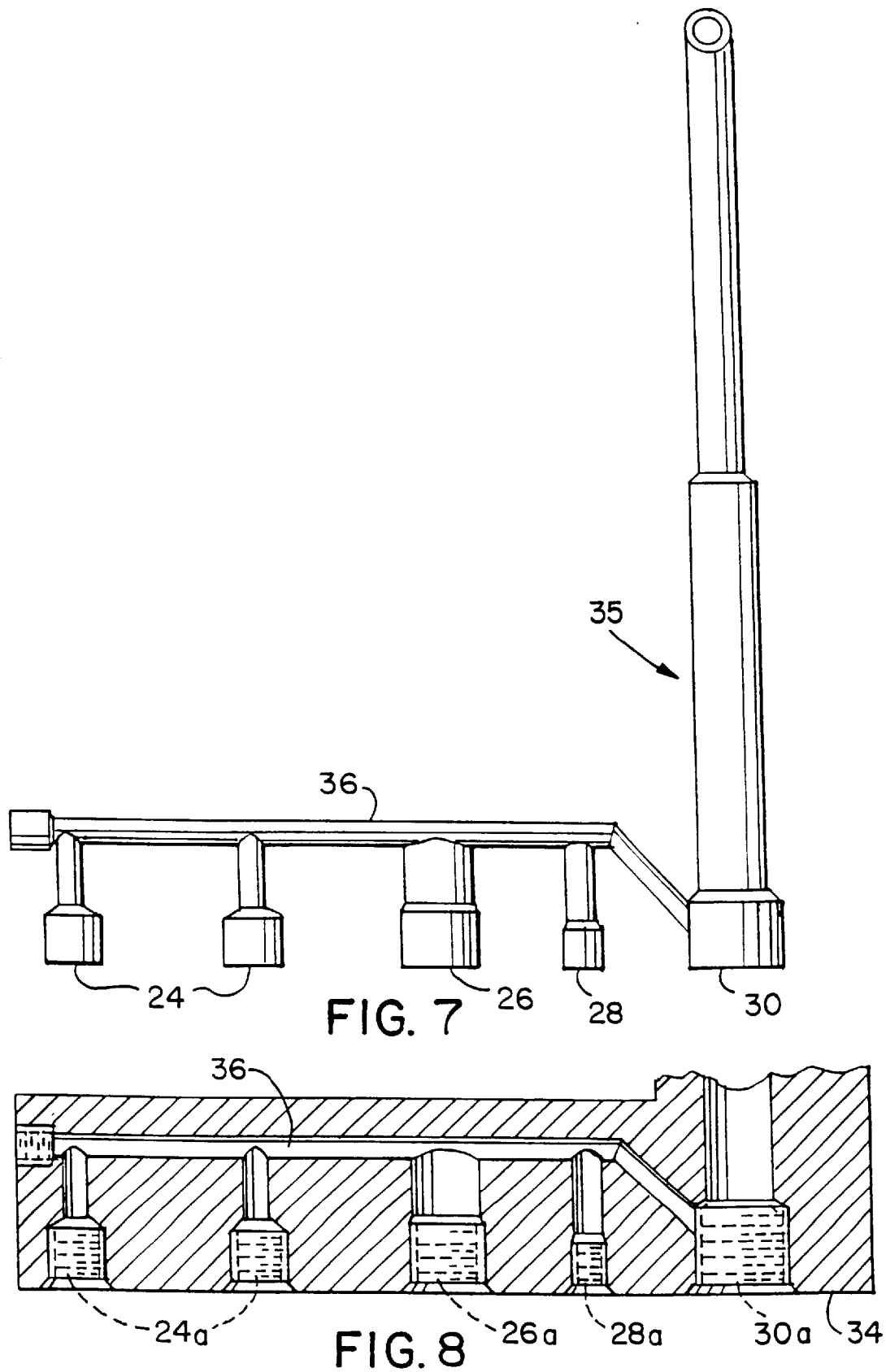

MELTER TANK FOR THERMOPLASTIC MATERIAL AND CHASSIS FOR SAID TANK

This application is a continuation of U.S. Ser. No. 09/334,318, filed on Jun. 16, 1999 now abandoned, which is a continuation of U.S. Ser. No. 08/833,943, filed Apr. 14, 1997 now U.S. Pat. No. 5,919,384, each disclosure of which is hereby incorporated by reference herein in its entirety.

FIELD OF THE INVENTION

This invention relates to an apparatus for melting and dispensing thermoplastic materials such as thermoplastic adhesives referred to as "hot melt" adhesives. More specifically this invention relates to a one piece melter tank which is suspended from a chassis which also serves as the housing for the entire assembly of the melting and dispensing apparatus.

BACKGROUND OF THE INVENTION

There are many known types of apparatus for converting thermoplastic or so-called "hot melt" materials from a solid state to a molten liquid state. The melted material was maintained in the molten state in the tank in sufficient volume to supply one or more applicators or dispensers. A number of design improvements were made over a period of time to provide greater efficiency of the melt tanks and reduce problems of charring or oxidation of the molten material due to the material being maintained in the molten state for a prolonged period of time.

A grid type hot melt applicator was designed to have the capability of melting a very high throughput of thermoplastic material in a very short time so that the molten material was not maintained in a molten state for prolonged periods of time which could result in degradation of the material. A typical grid type applicator is disclosed in U.S. Pat. No. 3,964,645. Other examples are shown in U.S. Pat. Nos. 3,981,416, 4,474,311, 4,667,850, and 4,821,922. Continued efforts to improve melter apparatus has resulted in the present invention.

OBJECTS OF THE INVENTION

A primary object of this invention is to provide a hot melt unit which is simple to construct and assemble and which can be produced at reduced cost to those devices of greater complexity.

Another object of this invention is to provide a low cost tank casting which does not require to of tank flanges which are needed on many of the previous designs.

Another object of the invention is to eliminate the need for providing a supporting base beneath the melt tank and manifold.

A still further object of this invention is to provide a more versatile pump/drive mounting surface.

An even further object of the invention is to provide a simplified one piece melt tank and manifold cast as an integral unit.

These and other objects of the invention will become more fully apparent from the description in the following specification and the attached drawings.

SUMMARY OF THE INVENTION

The combination of a melter tank for thermoplastic material and a supporting chassis comprising: a tank having a bottom and a plurality of sidewalls extending upwardly therefrom, forming an open topped tank, the sidewalls of the tank having upper edge portions extending around the top of the tank, heating means associated with the bottom of the tank, a chassis having a top and at least two sidewalls extending downwardly therefrom, a rigid top insulator panel to rest on the upper edge portions of the tank sidewalls, means connecting the tank to the top of the chassis with the rigid insulator panel clamped between the upper edge portions of the sidewalls and an underside of the top of the chassis to suspend the tank from the chassis.

DESCRIPTION OF THE DRAWINGS

FIG. 7 is a plan view of a subassembly of pipes forming a manifold duct system;

FIG. 8 is a fragmentary cross-sectional view of a cast manifold duct system with threaded steel nipple inserts;

DESCRIPTION OF THE PREFERRED EMBODIMENTS

Figure 1:
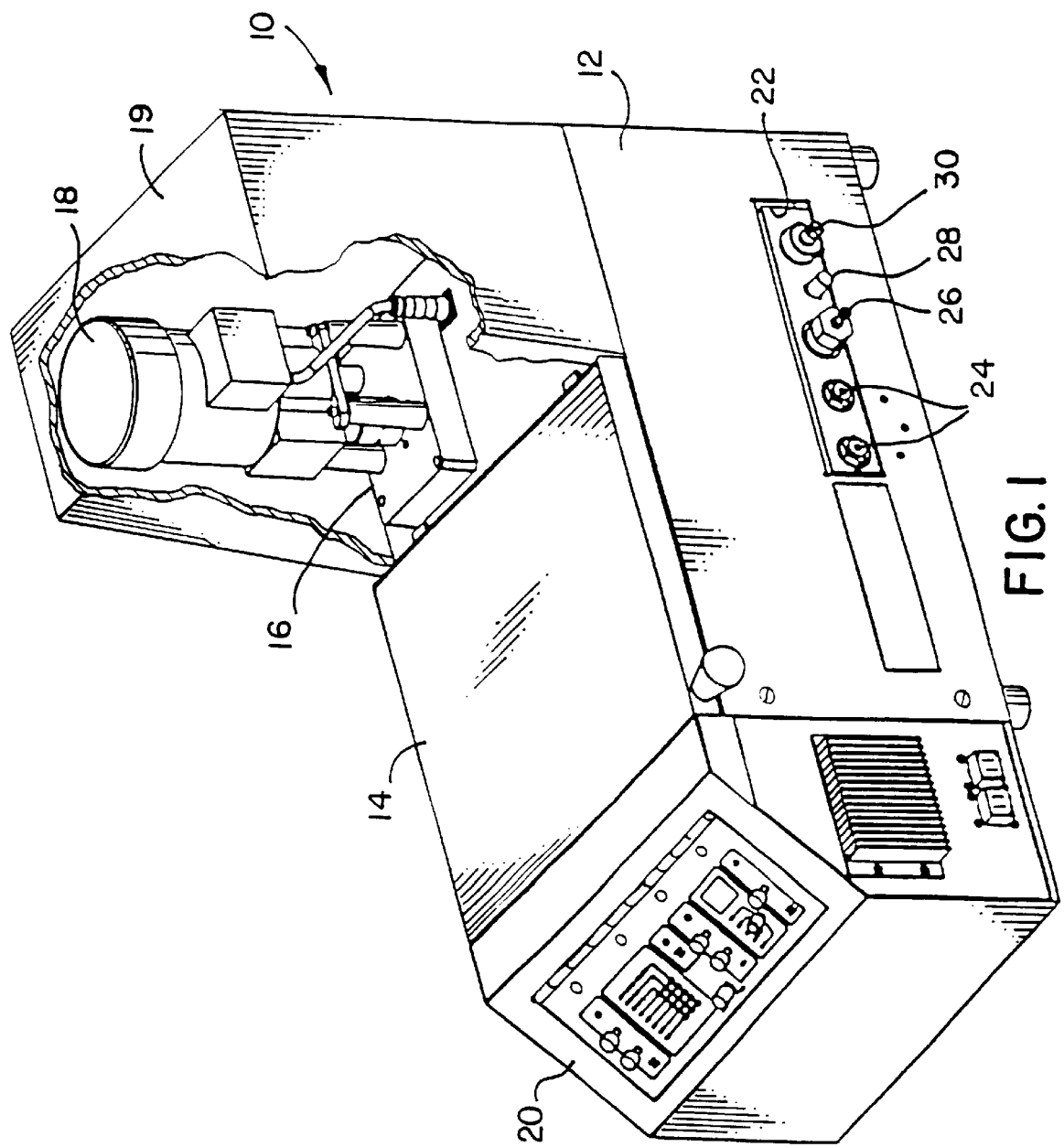
FIG. 1 is a perspective view of an entire assembly of a unit of melting apparatus for melting and dispensing thermoplastic material.

Referring now to the drawings and in particular to FIG. 1, a complete assembly of a melter unit for melting and dispensing thermoplastic material is indicated generally by the numeral 10. The unit 10 has a chassis 12 which also functions as a housing for the melt tank which will be shown and described in later drawing figures. A hinged lid 14 is mounted on top of the chassis/housing 12. A pump assembly 16 driven by an electric motor 18 is mounted on one end of the chassis 12. A pump cover 19 rests on the top of the chassis 12 and covers the pump 16 and motor 18.

On the opposite end of the chassis 12 is an electrical control box 20 which will not be described in further detail since it is not part of the invention.

A manifold access opening 22 is provided on one side of the chassis 12. Extending from the opening 22 are hose ports 24, a pressure control 26, a drain 28, and a filter unit 30.

Figure 2:
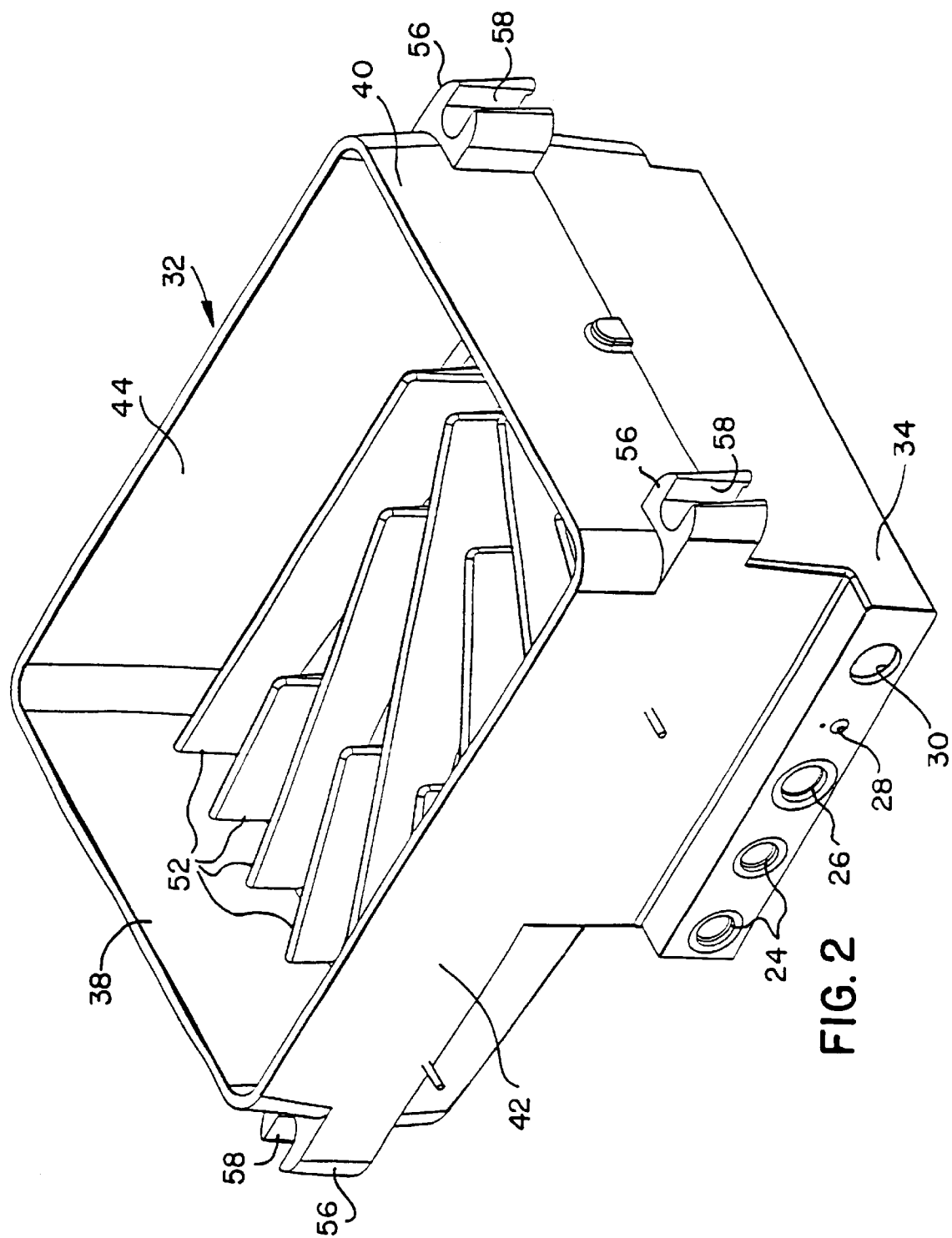
FIG. 2 is a perspective view of a melt tank of the invention with an integral manifold section cast in one piece with the melt tank.
Figure 5:
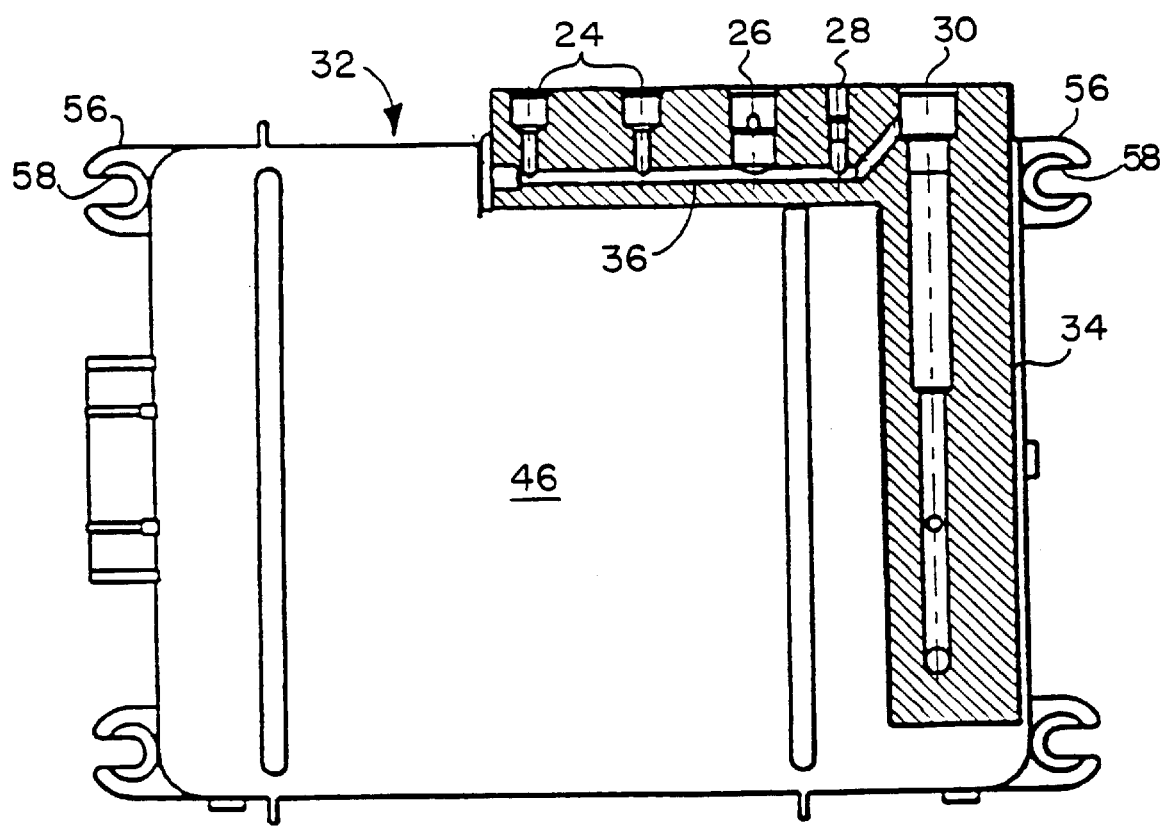
FIG. 5 is a bottom view of the tank of FIGS. 3 and 4, with a partial cross-section of the manifold taken on line 5—5 of FIG. 4.
Figure 6:
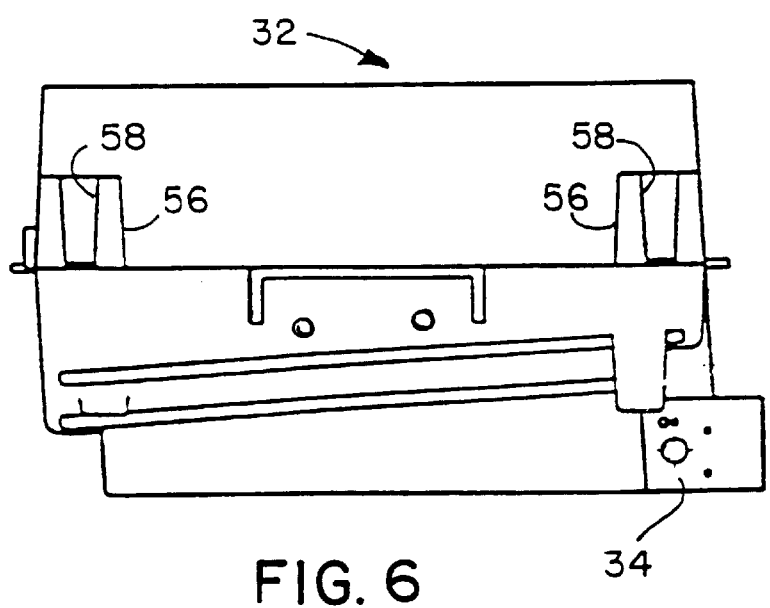
FIG. 6 is an end view of the melt tank looking at the left end of FIG. 4.

Referring now to FIGS. 2 through 6 and in particular to FIG. 2, a melt tank 32 preferably of cast aluminum has an integral manifold portion 34 cast on the bottom of the tank as best seen in FIG. 5. A manifold duct system 35 has a duct 36 which interconnects hose ports 24, the pressure control 26, the drain 28 and the filter unit 30 which were previously shown in FIG. 1 as projecting through an access opening 22 in the chassis 12.

The duct system 35 can either be machined into the manifold portion 34, or made with cast in place cored ducts and porting, or the duct system can be preformed as a subassembly of steel pipe or other suitable metal in a configuration similar to that shown in FIG. 7 and the subassembly can then be positioned in a mold (not shown) in which the melt tank is formed and the duct system can be cast in place within the manifold portion 34 at the same time the entire melt tank is cast.

If the duct system 35 uses standard cored porting in which the duct and ports are cast in place around, for example, a sand core, then internally threaded steel insert nipples 24a, 26a 28a and 30a as shown in FIG. 8 are needed to provide stronger threaded openings than would be provided by the cast material of the tank manifold 34.

The preferred method of forming the manifold duct system 35 is to preform a subassembly of steel pipes as shown in FIG. 7 wherein a duct 36 connects ports 24, 26, 28 and 30 all of which are brazed or welded together to form the subassembly 35. All the ports are internally threaded in the same manner as the steel nipple inserts 24a, 26a, 28a, and 30a shown in FIG. 8.

Using a preformed subassembly of steel pipes provides a duct system which is better able to contain the high pressure of melted liquid being pumped through the duct system and such steel pipe duct system compensates for any porosity in the tank material in manifold portion 34.

Regardless of which method is used for forming the duct system 35, it is important to have internally threaded steel nipples in the outlet ports to provide a positive seal with any components which may screwed into the port without the need for any O-ring seals.

Referring again to FIG. 2, the tank 32 which is of substantially rectangular shape has end walls 38 and 40 and sidewalls 42 and 44.

Figure 3:
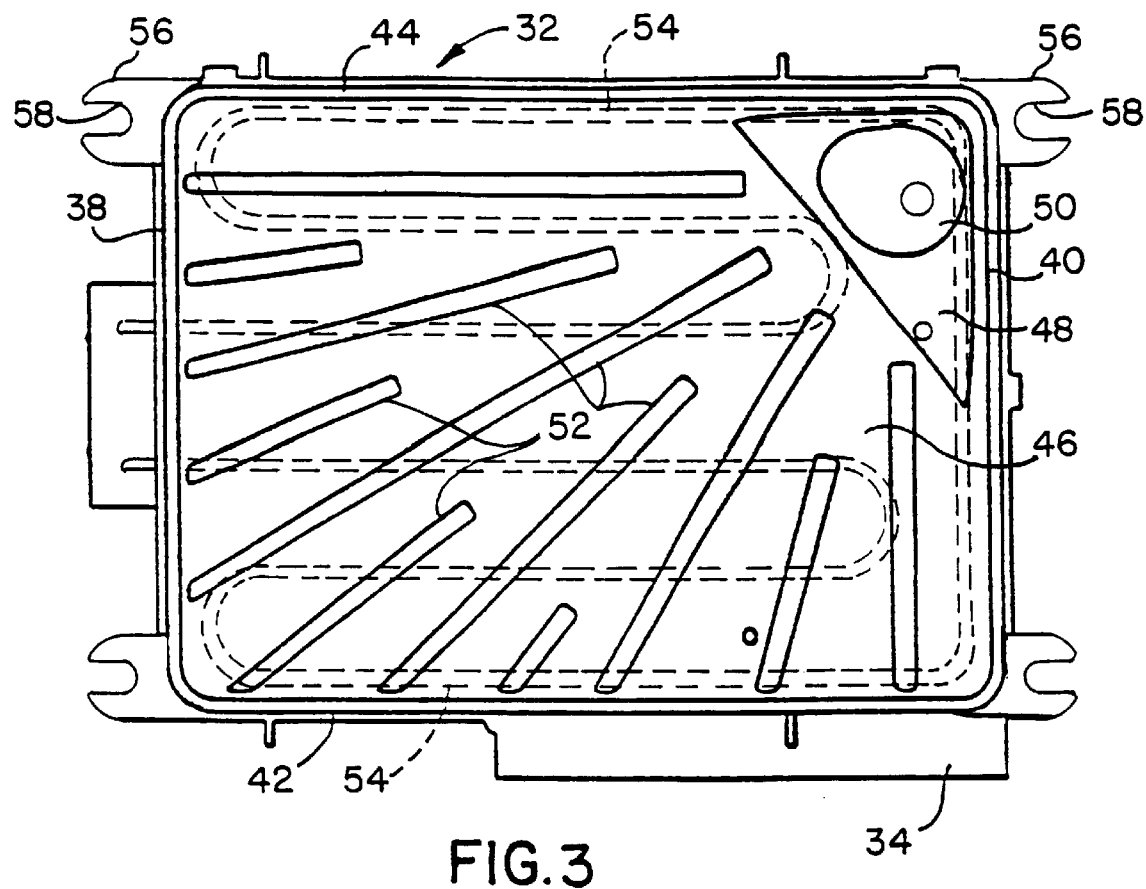
FIG. 3 is a top plan view of the melt tank of FIG. 2.
Figure 4:
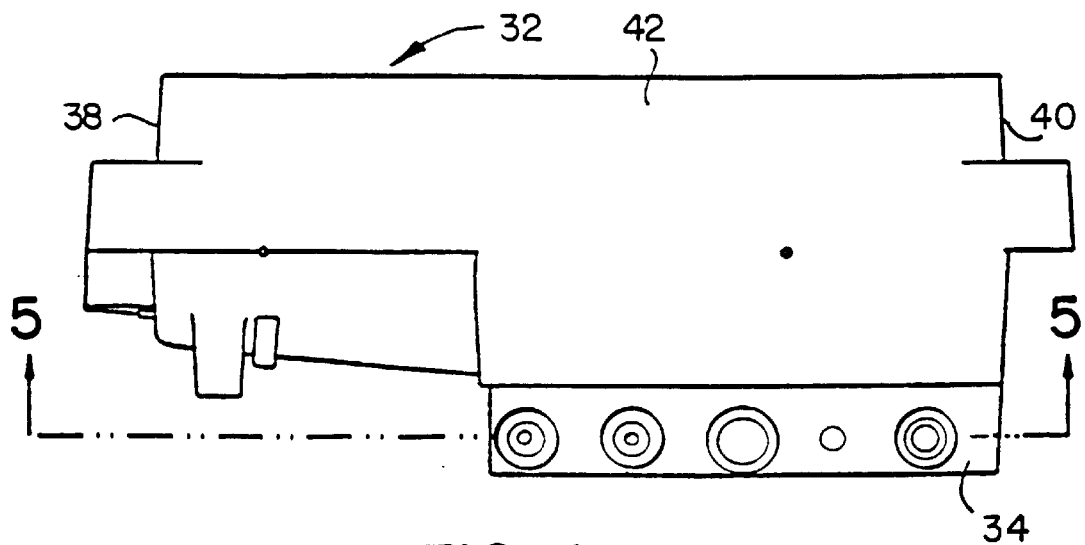
FIG. 4 is a side elevational view of the melt tank of FIG. 3.

A bottom 46 is inclined diagonally across the tank 44 at an angle with respect to a horizontal plane to permit drainage of molten material in the tank from the highest corner of the bottom to the lowest corner of the bottom which is indicated in FIG. 3 by a triangular low area 48 which also contains a circular pump recess 50. The recess 50 functions as a sump or collection recess from which a pump withdraws molten material as will be explained later in further detail.

As shown in FIGS. 2 and 3, a series of fins or ribs 52 extend vertically upward from the bottom 46 and are inclined at angles to direct the flow of molten material toward the low area 48 and the pump recess 50. As shown in FIG. 3, a sinusoidal pattern of electrical resistance heating wires 54 are embedded inside the tank bottom 46. These wires are connected electrically in a know manner (not shown) to an electrical power source in the control box 20. During the melting operation the wires 54 heat the tank bottom 46 and the heat passes through the fins 52 to provide heat transfer to the material in the tank.

A cast in place mounting tab 56 each having a slot 58 is positioned on each corner of the tank 32.

Figure 9:
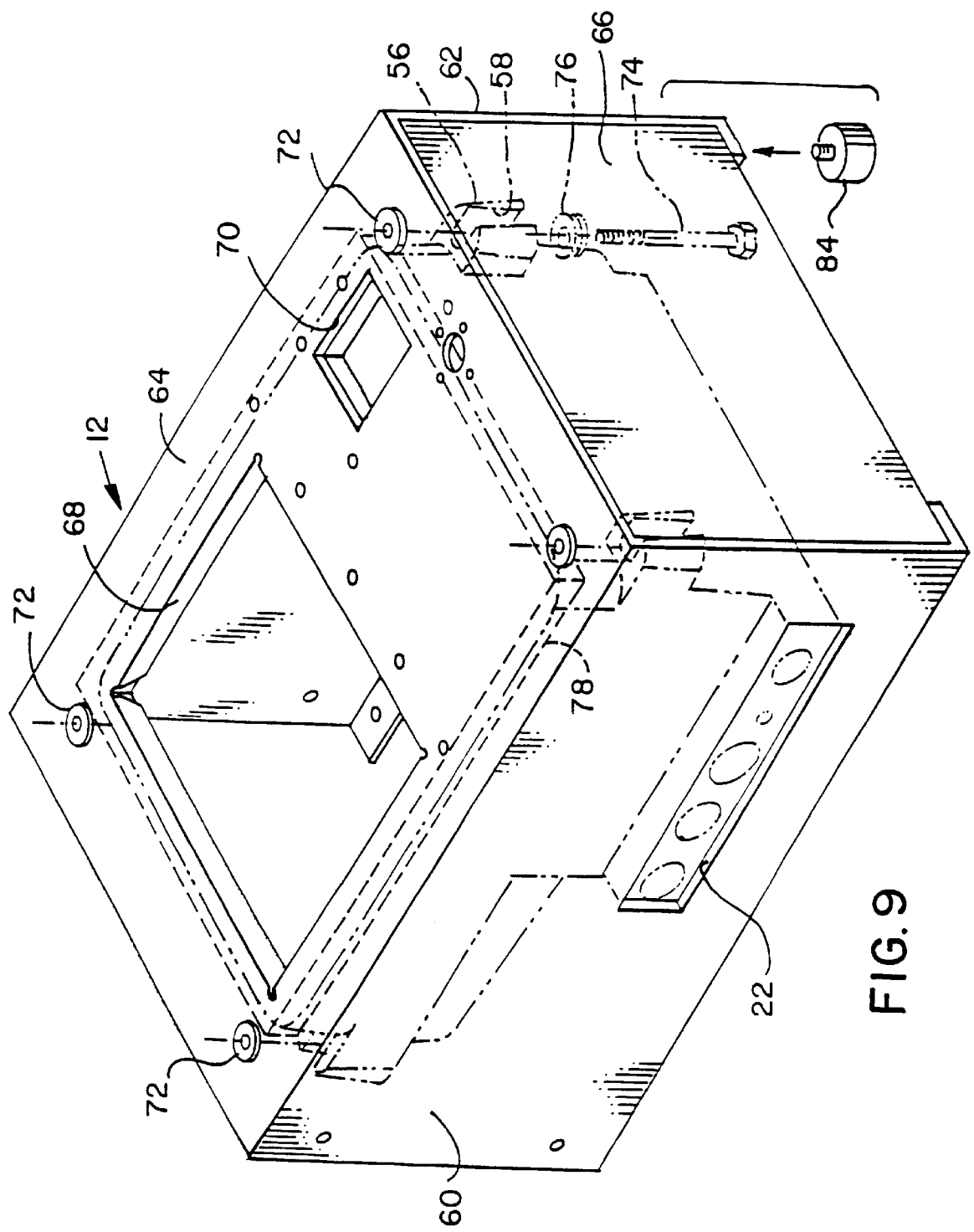
FIG. 9 is a perspective view of a chassis for supporting the melt tank of FIGS. 2 through 6 and showing the melt tank indicated by chain dotted lines mounted within the chassis.

The chassis 12 is shown in detail in FIG. 9 as a substantially rectangular box shaped member having sidewalls 60 and 62 formed integrally with a top 64 from heavy gauge sheet metal. A separate end wall 66 is attached to one end of the chassis and the opposite end is closed by the control box 20 shown in FIG. 1.

The top 64 has an access opening 68 which provides communication with the melt tank 32 and which is covered by the lid 14 shown in FIG. 1. A pump access hole 70 is also provided in the top 64 of the chassis 12 to receive the pump assembly 16 and to permit it to extend downwardly into the tank 32 as shown in FIG. 10.

A fixed nut 72 is attached to the chassis top 64 near each corner thereof in a position to be in alignment with one of the four mounting tabs 56 on the tank 32. Each tab 56 receives a bolt 74 extending through one of the slots 58 and screwing into one of the nuts 72. A plurality of "Belleville washers" 76 are positioned on each bolt 74 between the bolt head and the bottom of the respective mounting tab 56 when the bolt 74 is threaded into one of the nuts 72 and is tightened against the tab 56. The washers 76 compensate for expansion and contraction of the bolts 74 due to changes in temperature of the bolts.

Figure 10:
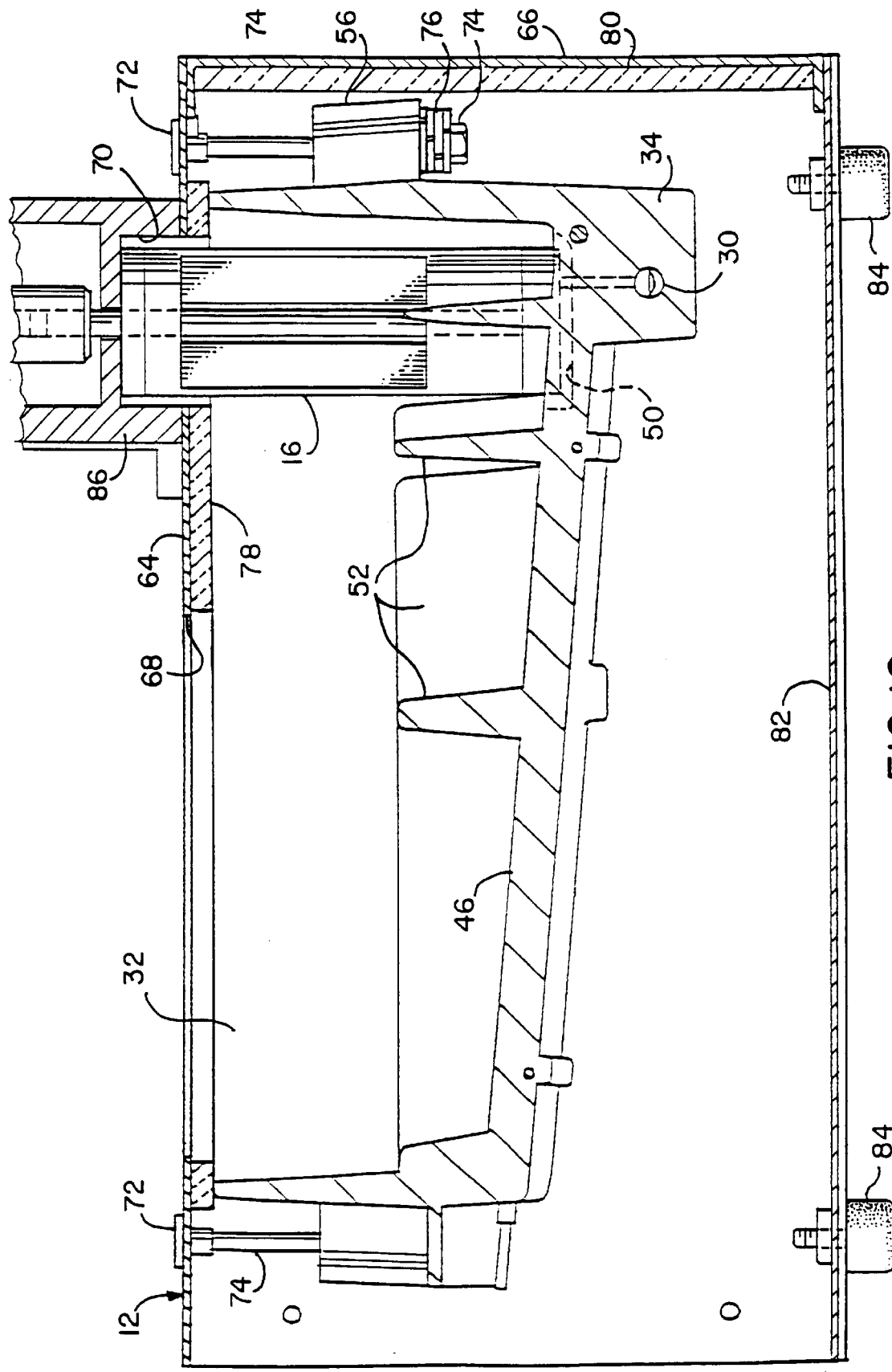
FIG. 10 is a cross sectional side view through the chassis and the melt tank with the melt tank mounted in a suspended position within the chassis.

As best seen in FIG. 10, the melt tank 32 when mounted in a suspended position from the chassis top 64 clamps a rigid insulation panel 78 between the top edge 33 of the tank 32 and the chassis top 64. The sidewalls 60 and 62 and ends of the chassis can be lined with flexible insulation panels 80.

The chassis 12 has a removable bottom 82 and four resilient foot pads 84 located at each corner to serve as vibration dampers.

The pump assembly 16 is mounted in the opening 70 by means of a drive mount 86 attached to the chassis top 64. The pump 16 extends downwardly to near the bottom of the pump recess 50. In operation the pump 16 draws in molten material from the recess 50 and passes it through a drop tube (not shown) into the manifold portion 34 where it passes through the filter unit 30 and then to the duct 36 and to hose ports 24. The operation of the pump 16 will not be described in further detail since the pump does not form part of the invention. For purposes of illustration a "Gerotor" type pump is shown which uses intermeshing gears to move the molten material from the recess 50 into the manifold portion 34, however other types of pumps can also serve this function.

It should be understood that certain variations can be made in the structural details of the melt tank and the chassis and these as well as other modifications can be made in the device shown herein without departing from the scope of the invention.

We claim:

1. A one piece cast melter tank for melting material, comprising:

a tank bottom;

a plurality of integral sidewalls extending upwardly from the tank bottom and forming an open topped chamber therewith;

a manifold section formed integral with the tank bottom; and a plurality of metal pipes configured to form a preformed duct system subassembly that is cast in place within the manifold section, the duct system communicating with the chamber for distribution of material melted within the chamber.

2. The melter tank of claim 1 further comprising a heater formed within the tank bottom.

3. The melter tank of claim 1 further comprising a plurality of metal ports coupled at terminal ends of the metal pipes.

4. The melter tank of claim 3 wherein each of the plurality of metal ports is internally threaded.

5. The melter tank of claim 1, wherein the tank has a plurality of heat transfer ribs extending upwardly from the tank bottom.

6. The melter tank of claim 1, wherein the tank is of substantially rectangular shape and the tank bottom is inclined diagonally from a highest level at one corner to a lowest level at a diagonally opposite corner of the tank.

7. The melter tank of claim 6 including a recessed area in the lowest level of the tank bottom for receiving a bottom end of a pump housing.

8. The melter tank of claim 1, wherein the melter tank has a plurality of projections extending outwardly from the side of the tank to receive fasteners which secure th tank to a chassis.

* * * * *